Figure 1:
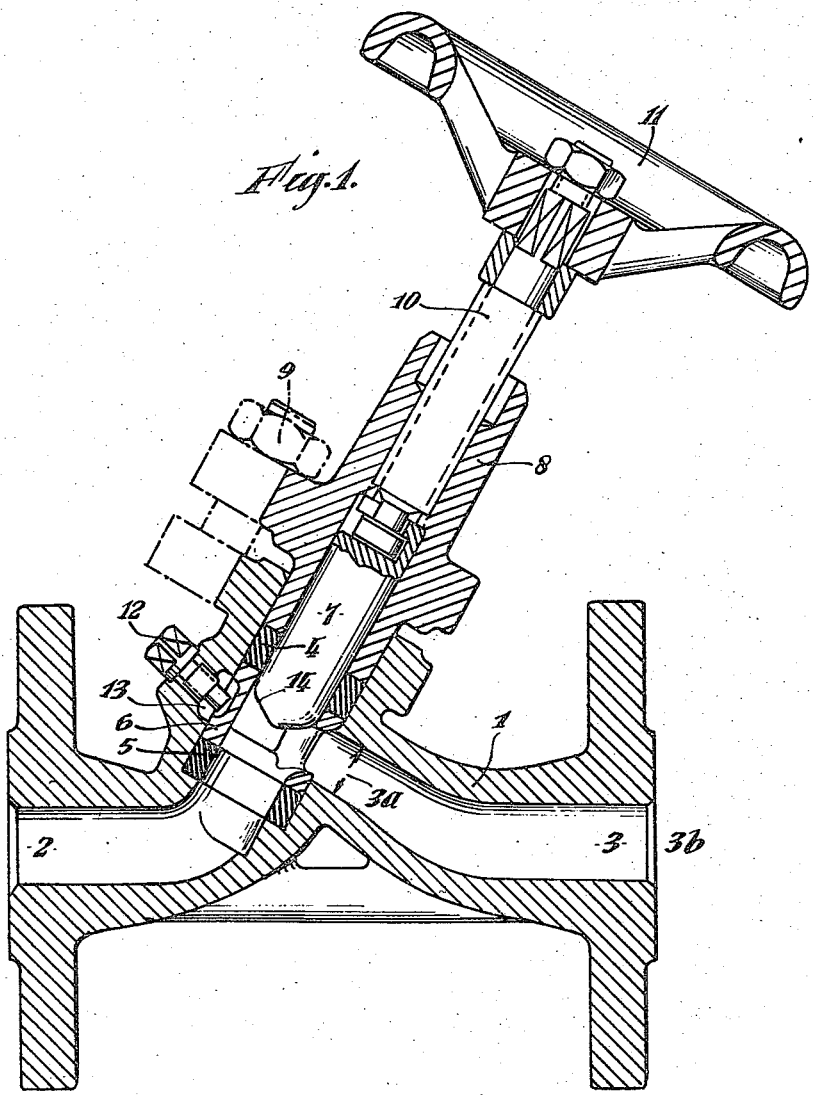

Oct. 21, 1958 J. KRUSCHIK 2,856,961
VALVES
Filed July 2, 1954 3 Sheets-Sheet 1

Oct. 21, 1958  J. KRUSCHIK  2,856,961
VALVES

Filed July 2, 1954  3 Sheets-Sheet 2

Inventor
Julius Kruschik
by Albert E. Jacobs
Attorney

Oct. 21, 1958 J. KRUSCHIK 2,856,961
VALVES
Filed July 2, 1954 3 Sheets-Sheet 3

Inventor
Julius Kruschik
by Albert E. Jacobs
Attorney 2,856,961

VALVES

Julius Kruschik, Vienna, Austria, assignor to Rich. Klinger Aktiengesellschaft, Vienna, Austria, a body corporate of Austria Application July 2, 1954, Serial No. 440,957

6 Claims. (Cl. 137—625.37)

The invention relates to valves, such as sluice valves, piston valves, stop cocks and the like and consisting of a valve housing providing a throughflow passage and a movable shut-off member.

In the construction of valves, the aim is to reduce the throughflow resistance to a minimum. For this purpose, in known constructions the valve housing is adapted by offsetting the inlet and outlet ducts thereof in relation to one another, as to so determine the path of the medium flowing therethrough that the axis of the throughflow passage is approximately S-shaped. The opening and closing action in such valves is usually effected by a shut-off member, generally of piston form, which in the closed position enters packing rings held apart by a spacer. In the open position of the valve the flowing medium or pressure medium follows an S-shaped path from the inlet duct, under the piston and thence through outlet apertures in the spacer to the outlet duct of the valve housing. Further steps for reducing the throughflow resistance and eddying have been proposed consisting in the provision around the spacer of a bead-like extension of annular or paraboloidal form, forming an annular chamber intended to intercept and deflect turbulent flow, and further in making the free end of the piston of concave form.

Although some of the efforts hitherto made, more especially the S-shaped form of the throughflow passage, have had some success, the co-operation of the various parts of the valve has not, on the whole, been satisfactorily attained from the viewpoint of flow technique. Apart from an appreciable pressure loss in the duct, inadmissible stressing of the materials employed has frequently occurred.

The invention, which is based on extensive practical experiments in a flow channel, has for its object to provide an improvement in valve construction from the view point of flow technique. The essential feature of the invention resides in that in a valve having a throughflow passage providing substantially an S-form course for the medium flowing therethrough and a movable shut-off member disposed at an opening, at which the flow is deflected in the open position of the valve, the outlet duct has a reduction in cross-section of preferably 5–10% beyond the point of deflection, the cross-section being gradually widened again after the constriction to the size of the cross-section of the inlet duct. By this means throttling of the flowing medium or pressure medium is produced within the valve housing, whereby turbulent flow is avoided.

Another feature of the invention resides in that the design of all parts co-operating in the operation of the valve are adapted to the course of the flow and these parts are adapted to one another in their dimensions. In piston valves, the design of the spacer, of the lower piston face serving as a baffle and of the annular chamber is of particular importance.

According to the invention, a piston valve may be designed with or without an annular chamber in combination with the described reduction of the cross-section of the outlet duct. If an annular chamber is employed, it is widened only to a relatively small extent and is preferably arranged eccentrically in relation to the spacer. The dimensions are adapted to the quantity of liquid or pressure medium flowing through. The cross-section of the annular chamber should increase proportionately to the liquid leaving the spacer, but it must not be unnecessarily large, because a disturbing suction effect will otherwise occur.

The design of the spacer is also of importance within the scope of the invention. It is preferably of symmetrical form in relation to the axial plane of symmetry of the valve housing and consists of two rings disposed at a distance apart, which are connected together by three cross members, of rounded cross-section.

It is particularly advantageous for the rear cross member lying opposite the outlet aperture to extend over a range of about 120° and for the two forward cross members situated on the liquid outlet side to be fashioned in streamlined form, and the housing may with advantage comprise two pocket-like lateral extensions. With this construction of the spacer, therefore, no annular chamber in the usual sense is employed.

In cases where spacers have hitherto been employed in piston valves, six flat and angular cross-members have always been provided between an upper ring and a lower ring, which have formed a relatively great obstacle to flow. According to the invention, however, only three supporting cross members are employed, as described, which are adapted to the course of the flow.

Figure 2:
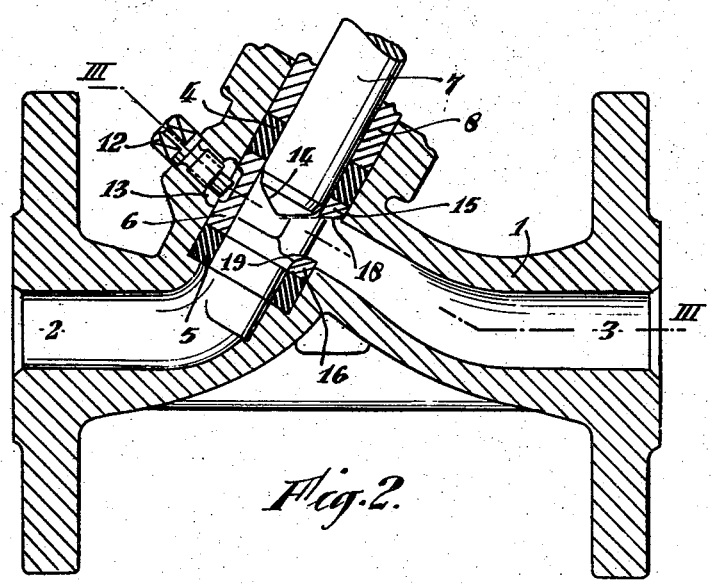
Figure 3:
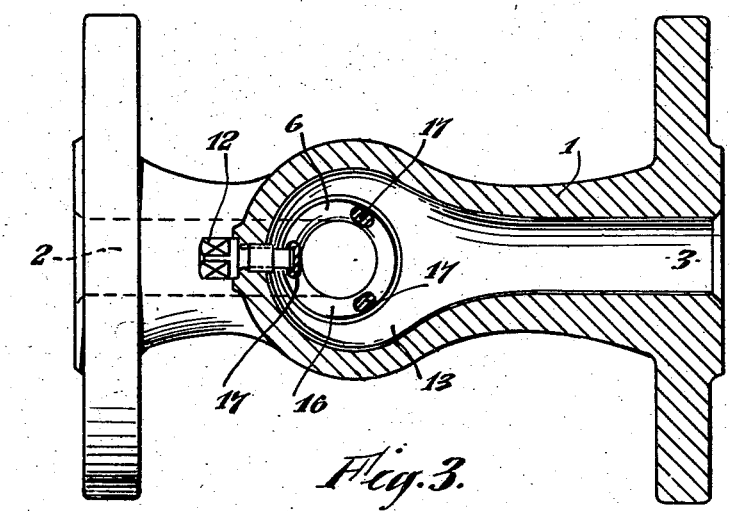
Figure 4:
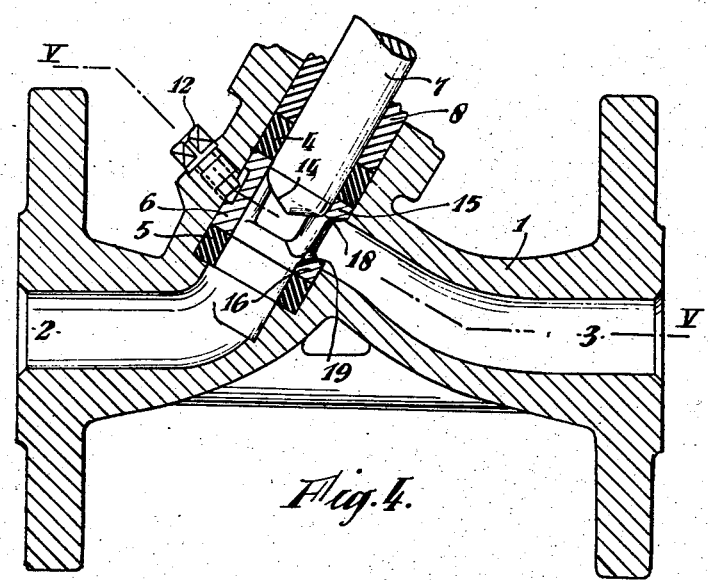
Figure 5:
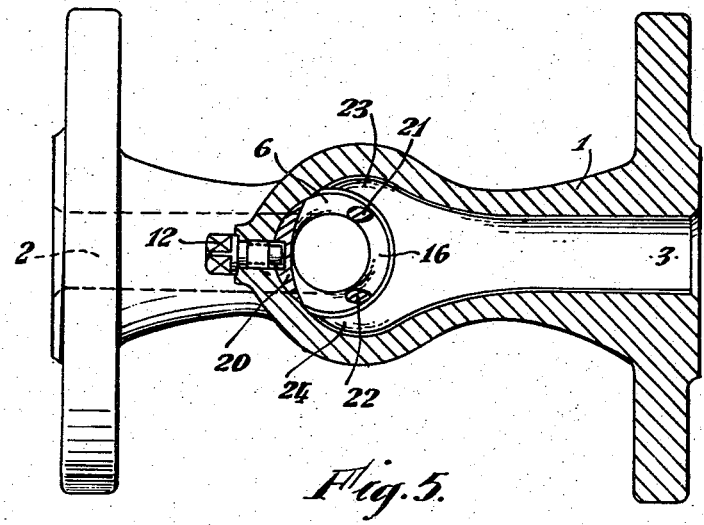

Examples of constructions according to the invention are illustrated in the accompanying drawings, wherein:

Figure 1 shows in sectional elevation the housing of a piston valve, a piston, a symmetrical spacer and an annular chamber, the valve being shown in the open position, Figure 2 shows in vertical section, the symmetrical spacer with an eccentric annular chamber, Figure 3 is a section on the line III—III of Figure 2, Figure 4 illustrates in section a spacer with a widened rear cross member, and without an annular chamber, and Figure 5 is a horizontal section along the line V—V of Figure 4.

The valve consists of a housing 1, an inlet duct 2 and an outlet duct 3, which form together a throughflow passage of approximately S-shape, conforming to the flow course of the medium passing therethrough.

While the inlet duct 2 and the opening at the piston seat are of equal cross-section, the cross-section of the outlet is narrowed at 3a, preferably by 5–10%. After the constriction, the outlet duct gradually widens until at the outlet aperture 3b it has the cross-section dimension of the inlet duct 2. The seal of the valve is provided by the packing rings 4 and 5, which are held apart by a spacer 6. The packing rings are compressed by the sleeve 8, secured to the housing by means of screws 9. The piston 7 is actuated by means of a screw threaded spindle 10 and a hand wheel 11. The spacer is secured against rotation by a screw 12, which engages in a recess 6a in the spacer 6. Provided concentrically around the spacer is a symmetrical annular chamber 13 of slightly flared form, which is dimensioned to co-operate with the constriction 3a at the outlet duct in such manner that damming up or throttling will arise in the valve housing, resulting in the spacer and the annular chamber 13 being completely filled by the medium flowing through the valve and resulting in little turbulence. The lower face 14 of the piston 7, which deflects the medium flowing through when the valve is in the open position, is also shaped to conform to the course of the flow. The face 14 is fashioned for example hemispherical, paraboloidal or, preferably, conical form, the opening angle of the cone being about 120°.

Figure 2 illustrates a spacer 6 of symmetrical form, having an eccentric annular chamber. The spacer consists of upper and lower rings 15 and 16 respectively, connected by three rounded cross members 17. The upper ring has in the direction of the outlet side a bevelled face 18, aligned with the deflecting surface 14, shown in chain lines, of the piston when the valve is in the open position. The lower ring 16 of the spacer has in the direction of the outlet side a face 19 curved from the inside towards the outside, also shaped to conform to the path of the flowing medium. An annular chamber 13 is provided eccentrically around the spacer in such manner that the distance of the spacer from the housing wall is smallest on the side opposite the outlet side. The cross-section of the annular chamber increases in proportion with the quantity of liquid leaving the spacer openings, until the largest cross-section of the annular extension around the spacer corresponds to one-half of the cross-section of the outlet passage and the sizes of their cross-sections are equal at the point at which the annular chamber merges into the outlet duct.

Figures 4 and 5 show a valve in which the annular chamber is omitted. The spacer consists of an upper ring 15 and a lower ring 16, which have, as in the constructional form illustrated in Figures 2 and 3, bevelled or half-round faces 18 and 19 conforming to the flow path. The spacer again has three cross members, namely a rear cross member 20 and front cross members 21 and 22 situated on the outlet side of the spacer. The cross member 20 is widened, so that it completely closes off about 120° of the rearward side of the spacer, and has a crescent-shaped cross-section conforming to the flow path. The forward cross members have a streamlined form and are rounded rearwardly so that they have a substantially peardrop-shaped cross-section. In the illustrated embodiment of the invention, an annular chamber completely surrounding the spacer is omitted, but the housing has two lateral pockets 23 and 24. In this constructional form, obstruction to flow is avoided in a particularly effective manner. The valve according to the invention effecting a reduction of the resistance to throughflow by up to 50%.

Auxiliary supporting cross members of smaller cross-section may be provided between the main supporting cross members of the spacer.

Although the invention is primarily intended for piston valves, it is not intended to be limited entirely thereto. The reduction in the cross-section of the outlet duct according to the invention may be applied partially or entirely to sluice valves and even to cocks, because in all these applications the same object is aimed at, namely reduction of resistance to a flowing medium or pressure medium.

What I claim and desired to secure by Letters Patent is:

1. A valve comprising a valve housing having an inlet duct and an outlet duct forming a throughflow passage of approximately S-form and a movable shut-off member disposed at an opening therebetween for flow deflection in the open position of the valve, the outlet duct having a 5–10% reduced cross-section beyond the point of deflection to produce a throttling effect and gradually widening to the cross-section of the inlet duct, the movable shut-off member including a piston and the valve housing having a spacer into which the piston moves and an annular chamber around said spacer between the spacer and the housing walls eccentrically arranged with respect to said piston, the distance of the spacer from the valve housing wall being smallest on the side opposite the outlet duct and the cross-section of the annular chamber increasing in proportion with the quantity of liquid leaving apertures in the spacer, the largest cross-section of the annular chamber being equal to half the outlet cross-section.

2. A valve according to claim 1 in which the spacer is held against rotation by a screw extending through the housing and engaging a recess in said spacer.

3. A valve according to claim 1 in which the spacer has an opening communicating with the outlet duct defined by walls contoured to the flow through the valve.

4. A valve comprising a valve housing having an inlet duct and an outlet duct forming a throughflow passage of approximately S-form and a movable shut-off member disposed at an opening therebetween for flow deflection in the open position of the valve, the movable shut-off member including a piston with a flow deflecting lower end and the valve housing being provided with a cylindrical spacer in which the piston moves, a sealing packing ring contacting each end of the spacer, a compression sleeve having a portion in said housing around said piston in contact with and exerting longitudinal pressure against one of the packing rings, the other packing ring being seated in said housing, and the said spacer being arranged in the housing to form an at least partially annular chamber around said piston and spacer, the spacer comprising upper and lower rings connected by a plurality of circumferentially spaced cross-members the cross-sections of which are streamlined in the direction of flow through the housing passage.

5. A valve according to claim 4, in which the chamber is annular and of smallest cross-section on the side opposite the outlet duct.

6. A valve according to claim 4, in which the chamber is incompletely annular and is in the form of a pair of lateral pockets facing the outlet duct, the chamber being closed on the side opposite the outlet duct over an angle of about 120°.

References Cited in the file of this patent

UNITED STATES PATENTS

| | | |
|---|---|---|
| 1,511,302 | Schnetzer | Oct. 14, 1924 |
| 2,598,187 | Meyer | May 27, 1952 |
| 2,621,015 | MacGregor | Dec. 9, 1952 |
| 2,685,426 | MacGregor | Aug. 3, 1954 |

FOREIGN PATENTS

| | | |
|---|---|---|
| 299,608 | Italy | Aug. 9, 1932 |
| 732,649 | France | of 1932 |
| 564,436 | Great Britain | of 1944 |